United States Patent
Beckman

(10) Patent No.: US 6,685,368 B1
(45) Date of Patent: Feb. 3, 2004

(54) PRINTING SYSTEM HAVING OUTPUT SAMPLING FEATURE

(75) Inventor: Orhan E. Beckman, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/282,361

(22) Filed: Oct. 28, 2002

(51) Int. Cl.[7] ............................................... B41J 11/44
(52) U.S. Cl. ............................ 400/70; 400/61; 400/76
(58) Field of Search ........................... 400/70, 74, 76, 400/61; 101/484

(56) References Cited

U.S. PATENT DOCUMENTS 5,377,587 A * 1/1995 Kobler ........................ 101/233
6,088,710 A * 7/2000 Dreyer et al. ................ 715/517
6,262,810 B1 * 7/2001 Bloomer ...................... 358/1.9
2001/0051964 A1 * 12/2001 Warmus et al. ............. 707/530

FOREIGN PATENT DOCUMENTS

| EP | 1120274 A2 | 8/2001 | |
| EP | 1190855 A1 * | 3/2002 | ........... B41F/33/00 |

* cited by examiner

Primary Examiner—Charles H. Nolan, Jr.
(74) Attorney, Agent, or Firm—Jeff D. Limon

(57) ABSTRACT

A method for generating a sample print of a document in a printing system is disclosed. The method includes receiving a request for a sample print of the document, incrementing a number of job prints of the document, printing the sample print of the document, and routing the sample print of the document to a sample print tray.

16 Claims, 3 Drawing Sheets

PRINTING SYSTEM HAVING OUTPUT SAMPLING FEATURE

BACKGROUND OF THE INVENTION

In a printing system, such as an offset printer, digital printing press, copier, and so forth, it is often desirable to evaluate the quality of the printed product while the system is in the process of executing the print job. The need to evaluate the printed product is especially apparent when the printing system is producing high-quality documents that are subject to approval by a customer. In order to evaluate samples of the printed product, the printing system operator is often required to periodically remove one or more of the printed documents from the printing system's output tray. If the printing system operator determines that the print quality has noticeably degraded, the operator can stop the print job and make adjustments to improve the quality of the documents printed by the printing system.

However, when the printing system is printing a publication such as a book or pamphlet, in which multiple single-page documents are included in the book or pamphlet, the removal of a single document from the printing system's page stream can adversely affect the page order. Thus, when a sample page is removed, the page must be reinserted into the printed output stack so that each copy of the completed publication includes the correct number of documents. However, in a high speed printing environment, the reinsertion of a previously removed page can be problematic.

Further, in the event that the printing system is printing a variable data document as part of a variable document print campaign, in which text and/or images are placed within copy holes according one or more rules that control the print campaign, the printing system operator may not have knowledge of when a particular variable data document is to be output from the printing system. This can be especially true when the printing system is a digital printing press in which a system controller determines which variable text and images are to be placed within a particular variable data document's copy holes only moments before the finished document is printed and routed to an output tray.

DESCRIPTION OF THE EMBODIMENTS

Figure 1:
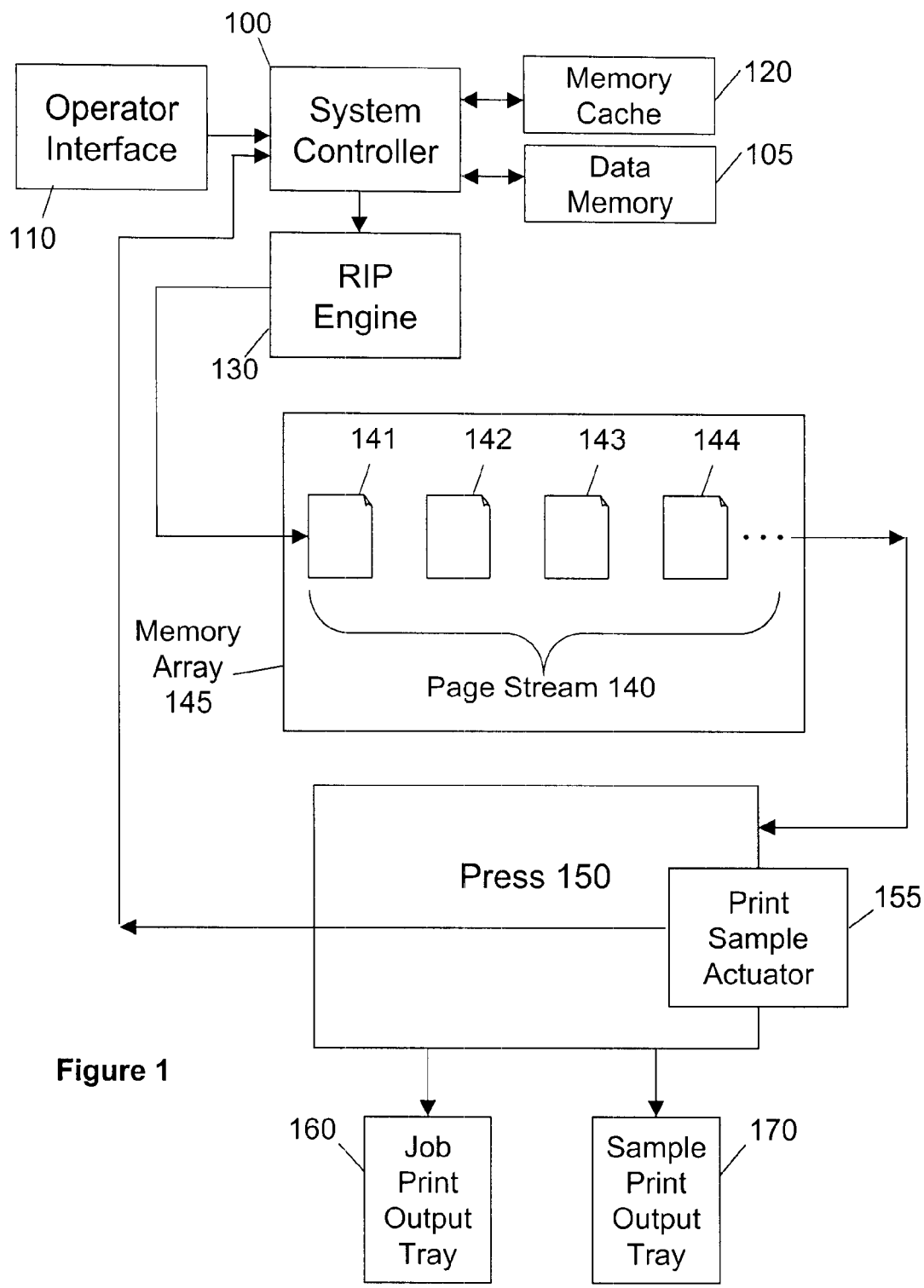
FIG. 1 is a block diagram of a printing system having an output-sampling feature in accordance with an embodiment of the invention.

In FIG. 1, system controller 100 controls raster image processing (RIP) engine 130. RIP engine 130 includes a digital output of documents 141,142, 143,144, and so forth, which are collectively referred to herein as page stream 140. In the embodiment of FIG. 1, each of the documents in page stream 140 are electronic representations of individual pages that are scheduled to be converted to a printed form, by way of press 150, and output to job print output tray 160. Thus, page stream 140 may represent a book or pamphlet that includes documents 141,142,143, and 144, or may represent copies of a single-page document. Page stream 140 may also represent a stream of variable data documents to be printed in support of a variable data print campaign. These documents may include single-page marketing collateral having text and/or images placed within copy holes in accordance with one or more rules that govern the print campaign. These copy holes may encompass the entire area of a single page document, or may encompass a portion of the area of the document.

RIP engine 130 of FIG. 1 is contemplated as including processing resources that convert high-level graphics description languages into lower-level commands necessary to control the functions of press 150. Thus, for example, RIP engine 130 may receive a description of a book or pamphlet from system controller 100 that includes multiple documents, with each document including copy holes filled with either text or images or both. System controller 100 assembles the document and conveys the information to RIP engine 130 by way of a portable document formatted (PDF) file, a PostScript file, an Encapsulated Postscript file, or other page description language. RIP engine 130 produces page stream 140 in terms of color content and the placement of the various colors on the documents that comprise the page stream on a dot-by-dot or other elemental form within memory array 145.

Page stream 140 can be contemplated as being a "pipeline" that exists in memory array 145 in which documents, such as document 141, are continuously being received from RIP engine 130, while other documents, such as document 144, are being processed by press 150 at the opposite end of the pipeline. The pipeline that carries page stream 140 between RIP engine 130 and press 150 can be implemented using any type of memory in which dot-by-dot descriptions of each document of page stream 140 are written by RIP engine 130 to memory array 145, which is accessible to both RIP engine 130 and press 150. Press 150 reads these memory locations in a circular manner starting with the memory location that contains the oldest data and proceeds toward locations that contain newer data. Thus, as older data is being read by press 150, those memory locations that contain the older data are filled with new data to be read by press 150 at a later time. The reading and writing functions performed by RIP engine 130 and press 150 are preferably performed under the control of a memory array controller that manages and coordinates access to memory array 145 so that data can be written to and read from the memory array in an orderly manner.

When the printing system of FIG. 1 executes a variable data print campaign, system controller 100 makes use of at least one variable data template that specifies the copy holes within each one of the documents of page stream 140. System controller 100 makes use of a high-level graphics description language to place the appropriate text and/or image asset within each copy hole according to one or more rules that govern the variable data print campaign. For example, a template of document 141 may include a copy hole for inserting a unique mailing address for the recipient of document 141. The template may also include one or more areas where images, such as images that pertain to the unique interests of the recipient of document 141, may also be inserted.

In another embodiment, print campaign rules are used to control a template used by system controller 100. Thus, for example, a rule may state that if the age of a recipient is between 18 and 25 years, the "generation-D" template is to be used. Another rule may state that if the recipient is over 55, use the "retiree" template. This allows different templates, with each template having a potentially unique group of copy holes, to be controlled by way of variable data print campaign rules.

In a given print campaign, there may be a set of several possible images or text blocks that can be placed within the copy holes of one or more templates of a given variable data document. However although several images are possible, only one image or text block can be placed within a given copy hole of a given document. These images or text may, for example, be related to a particular sports interest of the recipient, such as baseball, basketball, football, or volleyball, according to one or more rules that govern the print campaign. In the embodiment of FIG. 1, the rules that govern the print campaign are used by system controller 100 to control the occurrence of the text or image within the documents of page stream 140. An exemplary rule may be related to a recipient recently purchasing a ticket to one of the above-mentioned sporting events. Another exemplary rule may be the type of sports equipment recently purchased by the recipient. In these examples, the recent purchase of a ticket or equipment controls the placement of a related image in the copy hole. Other rules may be applied to control the occurrence of other variable data within the copy holes of documents of page stream 140.

In the embodiment of FIG. 1, the rules that govern the print campaign, the list of the recipients of the documents produced by the system of FIG. 1, along each recipient's address or other contact information, and any image and/or text assets inserted within the document copy holes are stored within data memory 105. System controller 100 accesses data memory 105 to assemble each document of page stream 140 by way of RIP engine 130.

System controller 100 of FIG. 1 includes an interface to memory cache 120 as well as operator interface 110. In the embodiment of FIG. 1, memory cache 120 maintains a high-level description of the documents that comprise page stream 140 so that the documents can be printed by press 150 and routed to sample print output tray 170 without requiring the system controller to reassemble the document using information stored in data memory 105. This can be especially useful in the event that documents 141, 142, 143, and 144 are variable data documents having content that varies from document to document.

In the embodiment of FIG. 1, operator interface 110 includes a graphical user interface that allows an operator of the printing system of FIG. 1 to interact with system controller 100. Thus, it is contemplated that operator interface 110 includes a display, a processor, a memory, as well as a bus that allows communications between the processor, the memory, and the display. The processor preferably executes an operating system that controls the graphical user interface and communicates with system controller 100.

In FIG. 1, system controller 100 creates and maintains a job schedule of documents to be printed by press 150. The scheduled documents are printed by press 150 and output to job print output tray 160. Each time a document is output to job print output tray 160 the schedule maintained by system controller 100 is decremented to reflect the completion of the document. Although FIG. 1 shows only a single job print output tray 160 that is used as a receptacle for scheduled prints, other embodiments may make use of multiple job print output trays. In these embodiments, press 150 includes a capability to route documents to the various job print output tray is as specified by system controller 100.

Press 150 also includes an output to sample print output tray 170. Sample print output tray 170 represents a receptacle that receives sample prints of documents as required for the operator to evaluate the print quality of the documents. Coupled to press 150 is print sample actuator 155. In the embodiment of FIG. 1, print sample actuator 155 represents a switch, button, or other instrument used to convey a manual input from an operator to system controller 100.

When the operator actuates print sample actuator 155, system controller 100 is requested to generate a sample print of at least one of the documents (or pages) of page stream 140 and route the sample to sample print output tray 170. In response to receiving the request from print sample actuator 155, system controller 100 increments the schedule that identifies the job prints to be printed by press 150 and retrieves the high-level description of the document from memory cache 120. The document is conveyed to RIP engine 130 and placed in page stream 140 for printing by press 150 and routed to sample print output tray 170. In some embodiments, operator interface 110 can be customized to respond to a single press of print sample actuator 155. For example, the operator may desire that a single actuation of print sample actuator 155 produce more than one sample print for routing to sample print output tray 170.

Print sample actuator 155 can also include a "press-and-hold" feature that allows the operator to print the set of documents that include certain variable data placed within one or more copy holes of each document. The press and hold feature can be brought about by the operator holding print sample actuator 155 for a duration greater than a predetermined period. In an alternate embodiment, a second one of print sample actuator 155 can be used to signal system controller 100 to print the set of documents that includes certain variable data placed within one or more copy holes of each document. Thus, the functionality of the press and hold feature of print sample actuator 155 as described herein can be brought about through the use of a single print sample actuator 155, of by way of a second one of print sample actuator 155.

In the event that the printing system of FIG. 1 is currently engaged in printing variable data documents, the press-and-hold feature of print sample actuator 155 can command system controller 100 to produce a set of documents that represent the different variable data possibilities for a given one or more copy holes. Thus, for example, in the event that a document being printed during a variable data print campaign includes a copy hole filled with one of four possible images, such as an image that is representative of football, basketball, baseball, or volleyball, the operator may press and hold print sample actuator 155 in order to receive the set of four documents with each document including an image of one of the aforementioned sports.

As previously mentioned, operator interface 110 can be used to customize the press-and-hold feature of print sample actuator 155 for a given variable data print campaign. Thus, operator interface 110 may allow the operator to specify that the set of documents produced by pressing and holding print sample actuator 155 results in the printing of documents that include the four possible images placed within a copy hole named "PHOTO_1" in a template that describes the document to system controller 100 and route the documents to sample print output tray 170.

In the event that system of FIG. 1 is executing a variable data print campaign that includes the printing of a book or a pamphlet, the press-and-hold feature of print sample actuator 155 can be customized to generate a set of sample of publications that include documents having copy holes filled with the different variable data possibilities that may occur in the publication.

In some embodiments, it may be impractical to print samples of documents that include all of the variable data image and text possibilities as a result of the use of the press-and-hold feature of print sample actuator 155. This can be especially apparent in the event that a variable data print campaign makes use of numerous templates, with each template having several copy holes that can be filled with a number of different images. In this event, operator interface 110 can be used to allow the operator to choose the set of variable data documents printed by way of the press-and-hold feature from the much larger collection of possible variable data documents that can be printed during the variable data print campaign. Alternatively, the press-and-hold feature can be customized to print a document having the most complex images and the largest possible amount of text that can be inserted into one or more copy holes of a given document or publication.

In another embodiment, operator interface 110 may be used to command system controller 100 to a print sample of one or more of the documents of page stream 140 based on the number of job prints printed by press 150 and routed to job print output tray 160. Thus, for example, the operator may request that one of documents 141–144 are to be routed to sample print output tray 170 at a rate of 1 sample print for every 100 job prints.

If the printing system of FIG. 1 is printing documents for a variable data print campaign, the rate at which sample prints are sent to sample print output tray 170 can vary as a function of the variable data that is placed in copy holes of the documents scheduled to be printed. Thus, for example, in the event that documents 141–144 include an image that represents either a football player, a basketball player, a baseball player, or a volleyball player be placed within a copy hole named "PHOTO_1", the operator can specify that the documents that include the football player be sampled at a higher rate that documents that include the image of the baseball player. This allows some documents printed during the variable data print campaign to be sampled at a higher or lower rate than other documents printed as part of the same campaign. The operator preferably interacts with operator interface 110 to establish any sampling rates prior to initiating printing of any documents.

Operator interface 110 can also be used to specify a sample rate based on the attributes of the documents printed by press 150. These attributes may include, but are not limited to, the length of a document, the color content of the documents, the amount and type of ink used, and so forth. By specifying differing sampling rates based on attributes of documents produced by press 150, documents which include more complex color compositions or documents that include higher resolution images can be sampled more often than documents having less complex color compositions and lower resolutions.

In addition to the content of each document, the sampling rate of a document can also pertain to a post-printing event, such as folding and binding the printed document into a publication. Thus, documents that are scheduled to undergo more folding and binding than other documents can be sampled at higher rates. This allows the operator to more closely monitor the placement of the images and text within the boundaries of the printed documents so that the folds in the finished documents are aligned with the various copy holes of the document.

Figure 2:
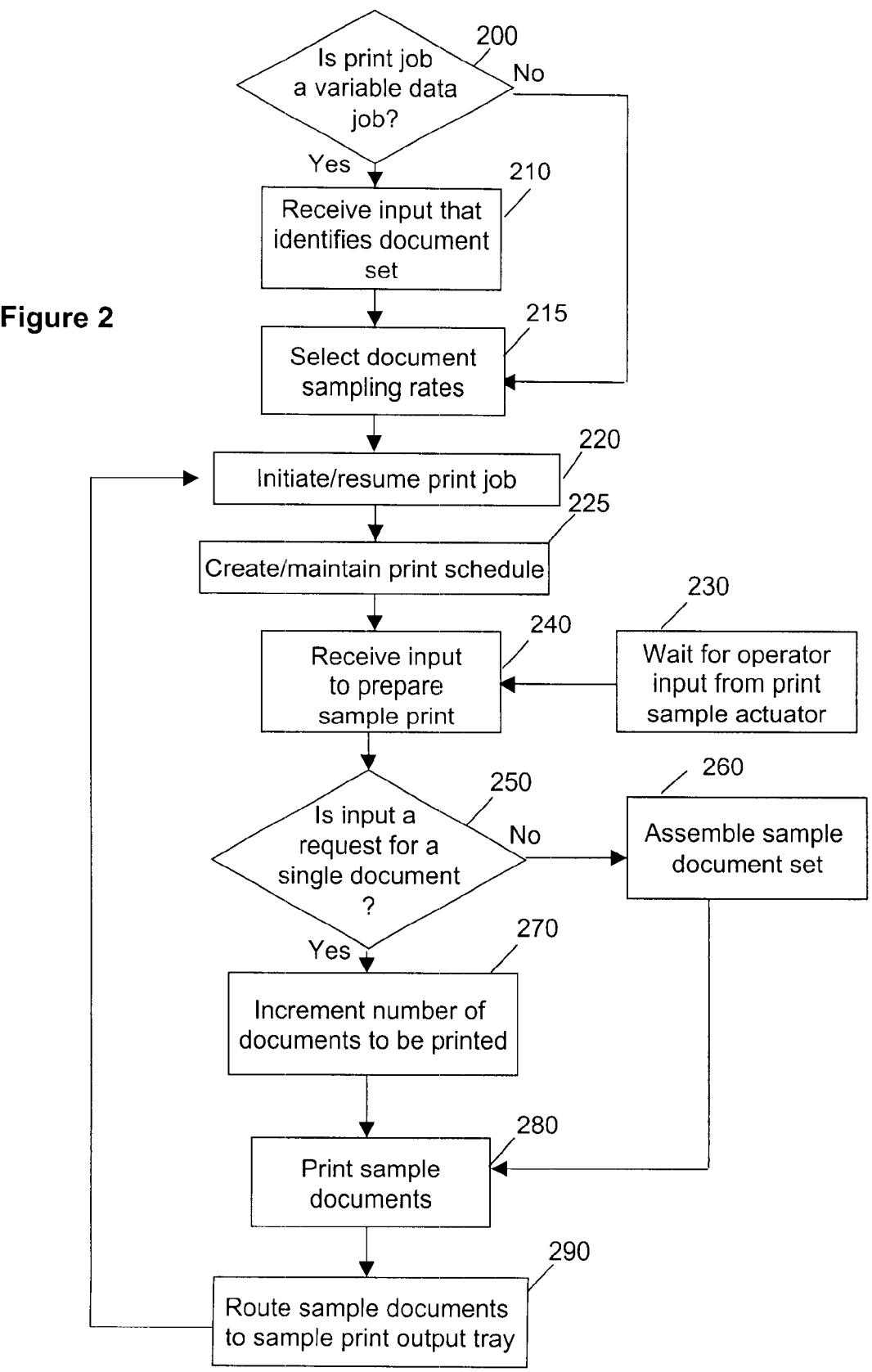
FIG. 2 is a flowchart for a method performed in a printing system having an output sampling feature according to an embodiment of the invention.

FIG. 2 is a flowchart for a method performed in a printing system having an output-sampling feature according to an embodiment of the invention. The embodiment of FIG. 1 is suitable for performing the method of FIG. 2. The method begins at step 200 in which a decision is made as to whether the print job is a variable data print job. If the decision of step 200 indicates that the print job is a variable data print job, step 210 is performed in which the operator defines the set of documents that are to be sampled when the operator requests that a set of sample documents be printed. As mentioned previously herein, the ability of the operator to define a set of sample documents to be printed as a result of actuating a print sample actuator (such as by pressing and holding a print sample actuator or through the use of a second print sample actuator) can be useful when there are numerous possible images and/or text blocks that can be placed within the job print documents. By defining the set of sample documents to be printed, the operator can select a set of documents that are useful in evaluating the quality of the documents that result from the variable data print job.

If the decision of step 200 indicates that the print job is not a variable data print job, or after step 210 is performed, step 215 is performed in which the sampling rates for the document is selected. Step 215 may include the operator selecting different sampling rates for different variable data documents, thus allowing variable data documents that include certain images and/or text to be sampled at a different rate than other variable data documents. The sampling rates selected at step 215 can also cause sample documents to be printed based on an attribute of the document being printed by the printing system. These attributes may include, but are not limited to, the length of the document being printed, the color content of the document, and so forth. The attributes may also pertain to a post-print process such as the number of folds that the document is scheduled to undergo in a post-printing environment.

The method then proceeds to step 220 in which the operator initiates the print job. While the print job is being performed, outputs are sent to a job print output tray. At step 225 a print job schedule is created and maintained. As job prints are output to the job print output tray, the print job schedule created in step 225 is maintained. In the embodiment of FIG. 2, sample prints are not included in the job print schedule.

The method continues at step 240 in which an input to prepare at least one sample print is received. Step 240 may include receiving an input from one or more print sample actuators (as instep 230) that instruct a system controller to produce a single sample of a printed document or to produce a set of documents wherein the set of documents has been identified by the operator in step 210. Step 240 can also be performed in response to receiving an input from a system controller (such as system controller 100 of FIG. 1) to print one or more sample documents in accordance with the sampling rates received from the operator in step 215.

At step 250, a decision is made as to whether the received request is a request to prepare one sample document or a set of sample documents. If the request pertains to a single document, the job print schedule is incremented by one (at step 270) and the sample document is printed at step 280. If, however, the request pertains to preparing a set of documents, step 260 is performed in which the sample document set is assembled and printed (at step 280). The one or more sample documents are then routed to a sample print output tray, at step 290. The method then proceeds to step 220 where the print job is resumed and scheduled prints are again routed to a job print output tray.

In some embodiments of the invention, not all of the steps of FIG. 2 are required. Thus a method for generating a sample print of a document, in a printing system may only include the steps of receiving a request for a sample print of the document (step 240), incrementing a number of job prints of the document (step 270), printing the sample print of the document (step 280), and routing the sample print of the document to a sample print tray (step 290).

Figure 3:
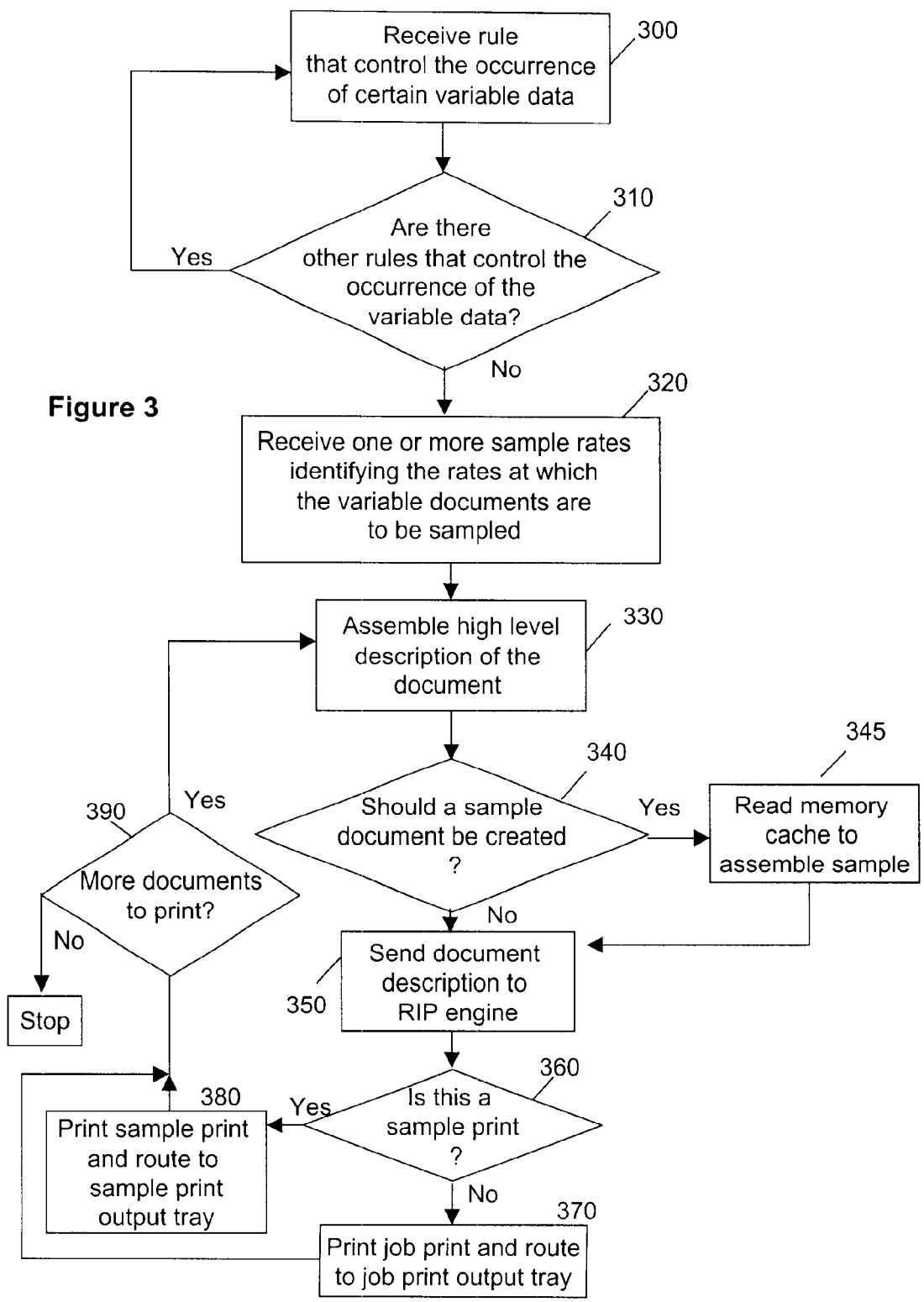
FIG. 3 is a second flowchart for a method performed in a printing system having an output-sampling feature according to an embodiment of the invention.

FIG. 3 is a second flowchart for a method performed in a printing system having an output-sampling feature according to an embodiment of the invention. The method of FIG. 3 can be performed using the system of FIG. 1 with the system being used for printing variable data documents. The method of FIG. 3 starts at step 300 in which the printing system receives a rule that controls the occurrence of certain variable data within a copy hole of a variable data document. An exemplary rule can, for example, specify that an image representing a certain sport (such as football) be placed in a copy hole of a document based on a recipient's interest in that sport. At step 310, a decision is made as to whether another rule controlling the occurrence of variable data within a copy hole is to be received. The second rule can, for example, specify that another sports image be placed within the copy hole based on the recipient expressing interest the other sport.

The method continues at step 320, in which a sample rate identifying the rate at which the variable data documents are to be sampled is received. The received sample rate may indicate that all variable data documents of a given print job are to be sampled at the same rate (such as 1 sample print for every 100 job prints). Step 320 can also include receiving a second document sampling rate. Thus, a first document (i.e. a document that includes a first image in the copy hole) may be sampled a first rate, such as 1 sample print for every 100 job prints of the document, while a second document (i.e. a document that includes a second image in the copy hole) may be sampled a second rate, such as 1 sample print for every 200 job prints of the document.

The method continues at step 330 in which a high level description of the document is assembled. At step 340, a decision is made as to whether a sample document should be prepared in addition to the assembled document. Step 340 preferably includes the application of a sampling rate to assembled document and relating the sampling rate to the number of documents that have been printed up to this point. If the decision of step 340 indicates that a sample of the document should be prepared, step 345 is performed in which the recently assembled job print of the document is read from a memory cache so that a sample of the document can be quickly assembled.

The method continues at step 350 in which the document descriptions are sent to a RIP engine for conversion to a lower-level or elemental form. The method continues at step 360 in which a decision is made as to whether the printed document is a sample print or a job print. If the print is a sample print, step 380 is performed in which the sample print is routed to a sample print output tray. If the print is a job print, step 370 is performed in which the job print is printed and routed to a job print output tray. In both cases, the method continues at step 390 in which a decision is made as to whether there are more documents to print. If there are more documents to print, the method returns to step 330 in which the next document is assembled. If there are no more documents to print the method stops after step 390.

Some embodiments of the invention for use in a printing system that generates a sample print of a document having variable data may only include the steps of receiving a rule that controls the occurrence of the variable data within the document (step 300), receiving a sample rate that identifies the rate at which the document is to be sampled (step 320), and printing the sample print of the document according to the sample rate, wherein the printing of the sample print occurs among job prints of the document (step 380).

In the embodiment of FIG. 3, the sampling rates for the documents produced by the printing system have been discussed in terms of the one sample for a predetermined number of job prints scheduled to be printed. However, the sample rates can also be expressed in terms of the quantity and/or type of ink used to produce each variable data document. Further, the sampling rates may be based on features of certain variable data images, such as complexity, color content, and so forth.

The examples of the sampling rates expressed herein have been described as being at a rate of 1 sample print document for every 100 job prints. However, in some embodiments, a sample print may be need at a rate of 1 sample for every 200 or more scheduled job prints. In other embodiments, a sample print may be required at rate of every 50 or fewer job prints.

In conclusion, while the present invention has been particularly shown and described with reference to the foregoing embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. In a printing system, a method for generating at least one sample print of a document, comprising:

receiving a sample rate that specifies the rate at which the at least one sample print is to be printed, wherein the sample rate is a function of the variable data that is placed in copy holes of the document scheduled to be printed;

incrementing a number of job prints of the document for each sample print;

printing each sample print of the document; and routing each sample print of the document to a sample print tray.

2. The method of claim 1, wherein the sample rate that specifies the rate at which the at least one sample print is to be printed is received while the printing system is currently engaged in document printing.

3. The method of claim 1, wherein the sample rate that specifies the rate at which the at least one sample print is to be printed is received prior to initiating printing by the printing system.

4. A method for printing a sample print of a document that includes certain variable data, comprising the steps of:

receiving a rule that controls the occurrence of the certain variable data within the document;

receiving a sample rate that specifies the rate at which the at least one sample is to be printed as a function of the variable data that is placed in copy holes of the document scheduled to be printed by a system controller; and printing the sample prints of the document according to the sample rate, wherein the printing of the sample prints occurs among job prints of the document.

5. The method of claim 4, wherein the sample rate is additionally a function of the amount of ink used to print the certain variable data.

6. The method of claim 4, additionally comprising the step of outputting the sample prints to a print sample output tray.

7. The method of claim 4, further comprising the steps of:

receiving a second rule that controls the occurrence of certain other variable data within a second document;

receiving a second sample rate that identifies the rate at which the second document is to be sampled; and printing the sample print of the second document, wherein the printing of the sample print of the second document occurs among job prints of the second document.

8. The method of claim 7, wherein the scheduled prints of the second document are among the scheduled prints of the first document.

9. A printing system, comprising:

a system controller for scheduling documents to be printed;

an operator interface that receives a command to print at least one sample of the documents scheduled to be printed by the system controller, the at least one sample being in addition to the documents scheduled for printing by the system controller, wherein the operator interface additionally receives a sample rate that specifies the rate at which the at least one sample is to be printed as a function of the variable data that is placed in copy holes of the documents scheduled for printing by the system controller; and a sample output tray that receives the samples of the documents.

10. The printing system of claim 9, wherein the operator interface additionally receives a sample rate that specifies the rate at which the at least one sample is to be printed as a function of the number of documents scheduled to be printed by the system controller.

11. A printing system, comprising:

means for scheduling documents to be printed;

means for receiving a request to print documents in addition to the documents scheduled to be printed; and means for outputting the additional documents to an output designated as a sample output tray, wherein the documents scheduled to be printed are variable data documents and wherein the request to Print additional variable data documents is based on an attribute of the variable data inserted into a copy hole of the variable data documents.

12. The printing system of claim 11, wherein the attribute is the color content of the variable data document.

13. The printing system of claim 11, wherein the attribute is the ink used to print the variable data document.

14. The printing system of claim 11, wherein the means for receiving a request is a print sample actuator coupled to the means for scheduling the documents to be printed.

15. The printing system of claim 14, further comprising a second print sample actuator coupled to the means for receiving a request to print documents, the second print sample actuator causing the means for receiving a request to print documents to print a set of variable data documents.

16. The printing system of claim 14, wherein the print sample actuator includes a press-and-hold feature, and wherein the press-and-hold feature causes the means for receiving a request to print a set of variable data documents.

* * * * *

UNITED STATES PATENT AND TRADEMARK OFFICE
CERTIFICATE OF CORRECTION

PATENT NO.     : 6,685,368 B1
DATED          : February 3, 2004
INVENTOR(S)    : Beckman It is certified that error appears in the above-identified patent and that said Letters Patent is hereby corrected as shown below:

<u>Column 10,</u>
Line 14, delete "Print" and insert therefor -- print --.

Signed and Sealed this

Twenty-seventh Day of July, 2004

JON W. DUDAS
*Acting Director of the United States Patent and Trademark Office*